Feb. 2, 1960  S. NACHEM  2,923,069
CODE TRANSMISSION DEVICE
Filed March 3, 1958

INVENTOR
SAMUEL NACHEM
BY Amster & Levy
ATTORNEYS

United States Patent Office 2,923,069
Patented Feb. 2, 1960

2,923,069

CODE TRANSMISSION DEVICE

Samuel Nachem, Yonkers, N.Y.

Application March 3, 1958, Serial No. 718,725

2 Claims. (Cl. 35—14)

The present invention retains to improvements in signal transmission devices and has particular relation to a novel and improved device for the visual transmission of coded messages, particularly messages sent in international Morse code.

According to the invention there is provided a housing containing one or more light sources which is adapted to visually transmit a succession of dots and dashes which symbolize letters forming words according to the international Morse code or other similar codes.

In an illustrative embodiment demonstrating features of the present invention there is provided a housing having a pair of light transmitting windows therein, one of the windows being shaped in a circular form to give the visual appearance of a dot used in Morse code transmission and the other window being of an elongated rectangular shape and giving the visual appearance of a dash. A pair of operating members are provided on the housing of the flasher assembly, which operating members are selectively and manually actuated by the user in order to illuminate either the "dot" window or the "dash" window. It is therefore unnecessary for the user to regulate the length of the transmitted signal in order to form dots and dashes, and the operator can devote almost his entire attention to the process of learning and using the code.

An object of the invention is the provision of a code transmission device of the character described which is particularly suitable for use by students of international Morse code in order to learn the same, and is also adaptable for use by children who are otherwise unfamiliar with Morse code.

Another object of the invention is the provision of a code transmission device of the character described in which the dot and dash symbols are visually transmitted in their actual shapes for easy and convenient reading by the person receiving the message, even though the person may be unfamiliar with Morse code. To further aid the recipient of the message in reading the same, the windows may be differently colored.

A further object of the invention is the provision of a code and transmission device of the character described, in which the operating members on the housing may be shaped in the form of a dot and a dash so that the operator may see at a glance the proper operating member to be actuated.

Additional objects and advantages of the invention will become apparent during the course of the following specification when taken in connection with the accompanying drawings in which.

Figure 4:
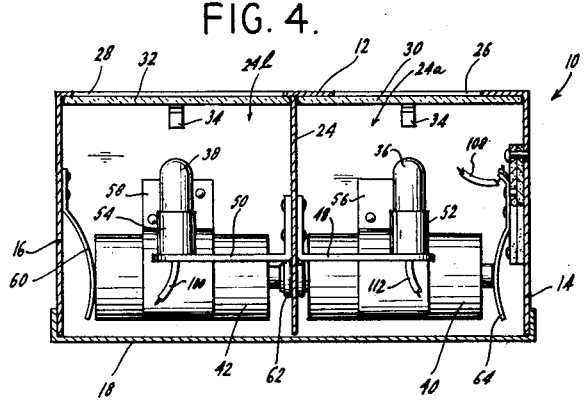
Fig. 4 is a transverse section taken along line 4—4 of Fig. 3.

Referring now in detail to the drawings, there is shown an improved code transmission device designated generally by the reference numeral 10. The device includes a hollow housing which is formed of a front wall 12, side walls 14 and 16, a top wall 20, a bottom wall 22, and a removable rear wall 18. The rear wall 18 is provided with a peripheral flange 18a which frictionally embraces the rear end portions of the top, bottom, and side walls to releasably secure the rear wall 18 on the housing.

The housing 10 is also provided with a central partition wall 24, which divides the housing interior into equal compartments 24a and 24b, which compartments are light-tight.

Figure 1:
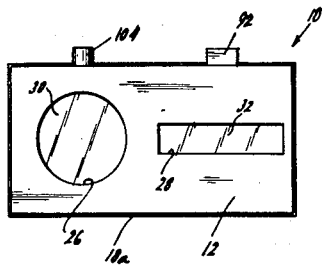
Fig. 1 is a front elevational view of the housing of a code transmission device made in accordance with the invention.

The front wall 12 serves as the code display panel of the housing and is provided with a pair of cut out portions or windows 26 and 28. The window 26 is of circular shape as shown in Fig. 1, and registers with the compartment 24a. The window 28 is of elongated rectangular shape and registers with the compartment 24b. It will be observed that the shape of the window 26 corresponds to the physical shape of a "dot," which is one of the symbols in international Morse code transmission, while the window 28 has the physical appearance of a dash.

Mounted immediately behind the windows 26 and 28, are a pair of light permeable plates or lenses 30 and 32 which are each held flush against the inner surface of the front wall 12 by a pair of spring clips 34. The plates 30 and 32 are preferably translucent so as to diffuse the light within the housing over the entire surface of the respective window 26 or 28, and the translucent plates may be colored differently as will be presently explained.

A pair of low voltage electric bulbs 36 and 38, for example flashlight bulbs, are mounted in the respective housing compartments 24a and 24b, the said bulbs being electrically connected for energization by a pair of conventional flashlight batteries 40 and 42 mounted within the housing, and selectively operable by respective switches 44 and 46. For purposes of mounting the bulbs 36 and 38, a pair of L-shaped brackets 48 and 50 are secured to partition 24. A pair of bulb sockets 52, 54 are attached to the respective brackets 48 and 50. To engage the respective batteries 40, 42 and to retain said batteries in mounted position, a spring contact 60 is secured to the side wall 16 and is positioned to engage and make contact with the lower wall of battery 42 which constitutes one terminal thereof. The tension of spring contact holding the battery 42 in abutment with the connector designated by the numeral 62 is continual. Likewise, the battery 40 is held in abutment with the connector 62 by means of a spring contact attached to the wall 14 and engaging the upper button terminal of battery 40.

Figure 3:
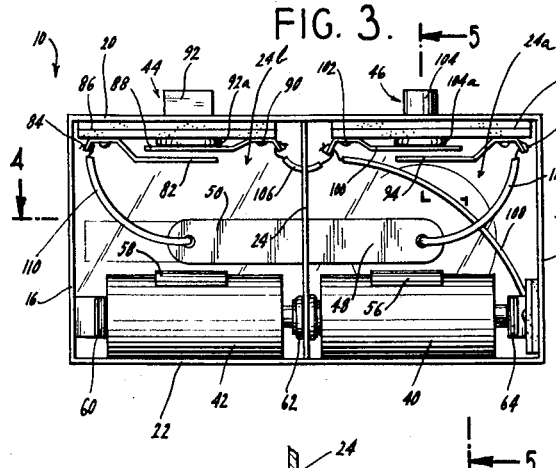
Fig. 3 is an enlarged elevational view of the code transmission device shown in Figs. 1 and 2 with the rear cover removed to reveal the inner structure thereof.
Figure 5:
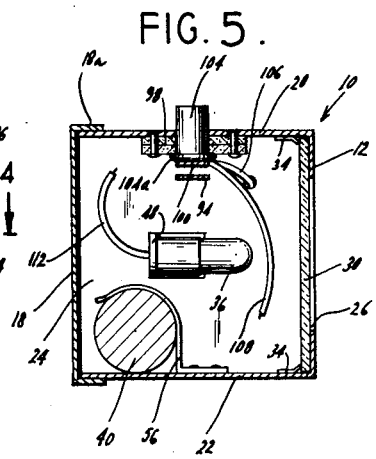
Fig. 5 is a vertical section taken substantially along the line 5—5 of Fig. 3.
Figure 6:
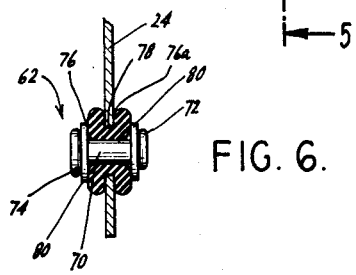
Fig. 6 is an enlarged sectional view of the battery connector mounted in the partition wall of the housing.

The batteries 40 and 42 are connected in series by the connector 62 which extends through the partition wall 24. As is clearly shown in Fig. 6, the connector 62 comprises a metallic conductor element 70 in the form of a rivet having a pair of flattened ends 72 and 74 serving as contact elements for the batteries. A grommet 76 of rubber or other flexible insulating material is carried by the conductor element 70 and has a circumferential slot 76a. The partition wall 24 has an aperture 78 through which the grommet 76 extends and is held in place by the reception of the wall portions bordering said aperture 78 within the grommet slot 76a. A pair of washers 80 may be employed to hold the conductor element 70 immovably within the grommet 76. As shown in Fig. 3, when the batteries 40 and 42 are in mounted position, the top button terminal of the battery 42 makes contact with the bottom wall terminal of battery 40 through the conductor element 70.

An electrical circuit is employed to connect the batteries 40 and 42, through the switches 44 and 46, to the bulbs 36 and 38. The switch 44 comprises an immovable switch element 82 having a terminal piece 84 secured to an insulating plate 86 mounted against the housing top wall 20. The switch 44 also includes a flexible contact arm 88 which overlies the fixed switch element 82 and has a terminal portion 90 also connected to the insulating plate 86. The switch 44 also incdludes a plunger or switch button 92 which extends through the housing top wall 20 and the insulating plate 86 and has a flat bottom portion 92a which is positioned to engage and depress the flexible contact arm 88.

The switch 46, which is located within the housing compartment 24a, is of a construction similar to the switch 44, including a fixed contact element 94 having a terminal portion 96 secured to an insulating plate 98, and a flexible contact arm 100 having a terminal portion 102. The switch 46 also includes a plunger or switch button 104 having a flattened lower portion 104a positioned to engage and depress the flexible contact arm 100.

The terminals 90 and 102 of the flexible contact arms 88 and 100 are electrically connected by a lead 106 which extends through the partition wall 24. Both flexible contact arms 88 and 100 are connected to one terminal of the battery series by a lead 108 joining the spring contact 64 to the terminal 102. The terminal 84 of the fixed contact element 82 is electrically connected to one terminal of the bulb socket 54 by a lead 110 extending from the terminal 84 to the terminal of bulb socket 54. Similarly, a lead 112 connects the terminal 96 of the fixed contact element 94 to one terminal of the bulb socket 52.

Figure 7:
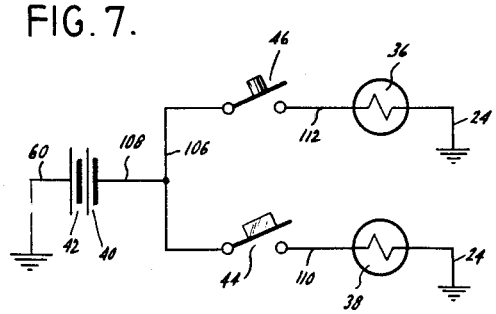
Fig. 7 is a schematic illustration of the electrical circuit employed for illuminating the lamps contained within the housing.

The housing 10 is made of conductive metallic material, and the outer shells of the bulb sockets 52 and 54 constitute the other terminals thereof. These terminals are electrically connected through the respective brackets 48 and 50 to the housing walls which constitute a ground connection as shown in Fig. 7. The spring contact 60 constituting the other battery series terminal is connected to the housing wall 16 for completing the ground connection. If the housing 10 is made of a plastic material or other non-conductive material, the housing walls will therefore not serve as a ground connection. In this instance, it will be obvious that the spring contact 60 must they be connected directly to the metallic brackets 48 and 50 by a lead wire.

It will be apparent that depression of the switch button 92 will close the switch 44, lighting the bulb 38 and illuminating the window 28, thereby transmitting a dash signal. Similarly, depression of the switch button 104 will close switch 46, lighting the bulb 36 and illuminating the window 26, thereby transmitting a dot signal.

Figure 2:
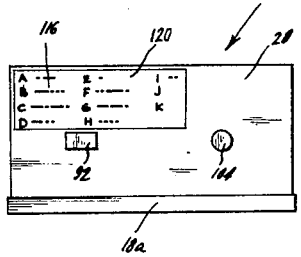
Fig. 2 is a top plan view thereof.

In order to facilitate the sending of code signals by use of the device of the invention, the switch button 92 may be made of an elongated rectangular shape having the visual appearance of a dash, and the switch button 104 may be made of a circular shape having the visual appearance of a dot. Thus, a child, or a person inexperienced in code may quickly and easily determine the proper switch button to select to transmit the desired code character. In addition, a key to the International Morse Code depicted by printed indicia 116 may be printed on the top wall or rear wall of the housing 10 where it may be readily observed by the user for purposes of sending or receiving coded messages. The code indicia 116 may be printed on a translucent plate 120, as shown in Fig. 2, which is set into one of the walls of the housing in communication with one of the light chambers thereof. Thus, for receiving signals at night, the code indicia 116 can be illuminated by lighting the appropriate lamp 36 or 38.

The plates or lenses 30 and 32 covering the respective windows 26 and 28 may be colored in different colors, such as one red and one green, whereby the person receiving the coded message may readily determine by means of color whether a dot or a dash has been transmitted, even if he is too far distant to distinguish the shapes of the windows.

While a pair of separate housing compartments, bulbs and switches have been shown and described in the illustrated embodiment shown herein, it is also contemplated that the invention may include a housing having a single compartment containing a continuously lit bulb, with window shutters operated by the buttons 92 and 104 in a manner which will be readily apparent.

While a preferred embodiment of the invention has been shown and described herein, it is obvious that numerous additions, changes and omissions may be made without departing from the spirit and scope of the invention.

What is claimed is:

1. A signal device for the visual transmission of successive dot and dash symbols to form letters in Morse code, said signal device comprising a portable housing including a front wall serving as a code display panel, a pair of light-penetratable windows in said front wall adapted to transmit light therethrough to the exterior of said housing, one window of said pair being of circular shape to represent a dot code symbol, a first colored lens inserted in said circular window for producing a first distinctive color for said dot code symbol, the other window of said pair being elongated and rectangular to represent a dash symbol, a second colored lens inserted in said rectangular window for producing a second distinctive color for said second code character, and means for selectively and successively illuminating said first and second windows intermittently to transmit illuminated dot and dash symbols to a location forwardly of the housing, said illuminating means including lamps in said housing behind the respective windows for illuminating said windows, a self-contained power supply for said lamps, and a pair of manually operable switches respectively in circuit with said lamps and power supply and projecting from said housing, one of said switches being selectively operable to illuminate said circular window, the other of said switches being selectively operable to illuminate said rectangular window.

2. A signal device according to claim 1 including means on said manually-operable switches representing the corresponding dot and dash symbols whereby the symbol to be transmitted may be visually observed from the exterior of the housing.

References Cited in the file of this patent

UNITED STATES PATENTS

| 1,302,715 | Salt | May 6, 1919 |
| 2,436,515 | Jones | Feb. 24, 1948 |
| 2,492,571 | Goldfarb | Dec. 27, 1949 |
| 2,500,507 | Avery et al. | Mar. 14, 1950 |
| 2,736,879 | Ferguson | Feb. 28, 1956 |
| 2,799,854 | Barnes | July 16, 1957 |

FOREIGN PATENTS

| 487,101 | France | Mar. 12, 1918 |